United States Patent
Dvorak

(10) Patent No.: US 6,298,765 B1
(45) Date of Patent: *Oct. 9, 2001

(54) MULTI-SHOCK ASSEMBLY FOR PROTECTING A SPACECRAFT SURFACE FROM HYPERVELOCITY IMPACTORS

(75) Inventor: Bruce D. Dvorak, Fullerton, CA (US)

(73) Assignee: McDonnell Douglas Corporation, Seal Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,962

(22) Filed: Dec. 2, 1998

(51) Int. Cl.⁷ ............................... F41H 5/04; F41H 5/013
(52) U.S. Cl. ...................................... 89/36.02; 89/36.07
(58) Field of Search ........................... 89/36.01, 36.02, 89/36.07, 36.08

(56) References Cited

U.S. PATENT DOCUMENTS

| 4,294,886 | 10/1981 | Uram, Jr. | 428/412 |
| 4,343,928 | 8/1982 | Uram, Jr. | 528/108 |
| 4,352,848 | 10/1982 | Uram, Jr. | 428/192 |

FOREIGN PATENT DOCUMENTS

| 1135342 | * 8/1962 | (DE) | 89/36.02 |

OTHER PUBLICATIONS

Christiansen E L, Kerr J H, De La Fuente H M, Schneider W C: Flexible and deployable meteoroid/debris shielding for spacecraft: Proceedings of the 1998 Symposium "Hypervelocity Impact", Nov. 17–19, 1998, pp. 125–136, XP000904895; Huntsville, AL, USA.

(List continued on next page.)

Primary Examiner—Stephen M. Johnson
(74) Attorney, Agent, or Firm—Lawrence N. Ginsberg

(57) ABSTRACT

A hypervelocity impact shield assembly for protecting a spacecraft surface from hypervelocity impactors. The shield assembly includes at least one sacrificial impactor disrupting/shocking layer of hypervelocity impactor disrupting/shocking material. A primary spacing element, including space-rated open cell foam material, is positioned between the at least one sacrificial impactor disrupting/shocking layer and a spacecraft surface. A cover member is arranged and disposed relative to the sacrificial impactor disrupting/shocking layer and the primary spacing element to maintain the integrity of the hypervelocity impact shield assembly. In the event of exposure to a hypervelocity impactor, the sacrificial impactor disrupting/shocking layer is perforated while shocking the impactor breaking it into fragments, and/or melting it, and/or vaporizing it, thus providing a dispersion in the form of an expanding debris cloud/plume which spreads the impact energy of the impactor over a volume formed by the primary spacing element between the sacrificial impactor disrupting/shocking layer and the spacecraft surface. This significantly reduces impact lethality at the spacecraft surface. The space-rated open cell foam material provides an extremely lightweight, low-cost, efficient means of spacing and supporting the at least one sacrificial impactor disrupting/shocking layer before, during, and after launch. In a preferred embodiment, the invention is in the form of a multi-shock assembly including a plurality of sacrificial impactor disrupting/shocking layers. In such instance, the hypervelocity impact shield assembly includes a plurality of secondary spacing elements. Each secondary spacing element is positioned adjacent an associated sacrificial impactor disrupting/shocking layer to form a multi-shock subassembly. Thus, a plurality of multi-shock subassemblies are provided which include alternating layers of sacrificial impactor disrupting/shocking layers and secondary spacing elements.

5 Claims, 2 Drawing Sheets

U.S. PATENT DOCUMENTS

| | | | |
|---|---|---|---|
| 4,391,924 | | 7/1983 | Uram, Jr. ............................ 521/178 |
| 5,030,518 | * | 7/1991 | Keller ................................. 428/550 |
| 5,067,388 | | 11/1991 | Crews et al. ....................... 89/36.02 |
| 5,217,185 | * | 6/1993 | Rucker ............................... 89/36.02 |
| 5,310,592 | | 5/1994 | Baker et al. ........................ 428/117 |
| 5,601,258 | | 2/1997 | McClymonds .................. 244/158 R |
| 5,610,363 | | 3/1997 | Crews et al. ....................... 89/36.02 |
| 5,803,406 | * | 9/1998 | Kolodziej et al. ............... 244/158 A |

OTHER PUBLICATIONS

Shortcliffe G, Christiansen E: "NASA JSC Technical Report JSC 27892: Mars Trans Hab Meteoroid and Orbital Debris Shield Performance Assessment" Jul. 1997, NASA Johnson Space Center, XP002135886.

Christiansen E L: "Advanced Meteoroid and Debris Shielding Concepts", AIAA/NASA/DOD Orbital Debris Conference: Technical Issues & Future Directions, vol. AIAA 90–1336, 1990, pp. 1–14, XP002135897.

Scott W B: "Leonids Shower Triggers New Look at Space Debris", Aviation Week and Space Technology, US, McGraw–Hill Inc. New York, vol. 150, No. 1, Jan. 4, 1999, pp. 51–52, 55, XP000790772.

Takano A et al: "Space Debris Related Activities in NASDA" Proceedings of the European Conference on Space Debris, vol. ESA SP–393, May 1997, XP000749361.

* cited by examiner

MULTI-SHOCK ASSEMBLY FOR PROTECTING A SPACECRAFT SURFACE FROM HYPERVELOCITY IMPACTORS

STATEMENT OF GOVERNMENT INTEREST

This invention was made under Government Contract NAS15-10000 awarded by the National Aeronautics and Space Administration (NASA). The Government has certain rights in this invention.

BACKGROUND OF THE INVENTION

1. Field of the Invention

The present invention relates to the protection of spacecraft from hypervelocity impactors and more particularly to a stand-alone, self-contained impact shield assembly for protecting a spacecraft surface from such hypervelocity impactors.

2. Description of the Related Art

Designing spacecraft for the future has introduced many new challenges. One such challenge is to provide affordable, maximum protection against the ever increasing threat of man-made orbital debris. As spacecraft soar into near-earth orbits they share orbital space with thousands of large and perhaps tens of millions of medium-sized debris objects left from 3,800 previous space missions since 1957. It has been estimated that the total amount of debris orbiting below 1,240 miles is between 8.5 and 10 millions pounds and is increasing. The average accidental impact velocity between spacecraft and orbital debris in this region is 10 kilometers per second (22,300 miles per hour) and can reach velocities as high as 15 kilometers per second (34,000 miles per hour). At these velocities, a piece of debris no larger than a garden pea carries the destructive punch to potentially cripple an entire unprotected spacecraft.

Currently, spacecraft (particularly manned spacecraft) use bulky, heavy metallic "bumpers" to protect critical areas. These bumpers, which usually consist of thin aluminum sheets placed 4 to 8 inches off the surface they are protecting, are designed to be perforated when impacted by a meteoroid or debris particle while shocking the particle and breaking it into fragments. These fragments disperse in an expanding debris cloud which spreads the impact energy over a much larger area, making it far less damaging to the surface behind it. If the impacting velocity is high enough, melting or vaporization will occur, which aids in reducing impact lethality.

The shortcomings associated with the standard metallic bumper concept are numerous. First and most importantly, metallic bumpers are very heavy. Since bumpers are the outer-most spacecraft surface, their large surface area translates to excessive weight. In addition, in order to survive the rigors of launch, bulky structure is necessary to support these bumpers. The industry rule-of-thumb is that metallic bumpers and support structure are expected to contribute approximately 5–10% to the total vehicle weight.

Secondly, high performance metallic bumper concepts often violate payload volumetric constraints. The volume consumed by such designs is significant when bumper shields protrude out 4 to 8 inches from the vehicle surface they are protecting. This space is preferable for functional equipment.

Thirdly, metallic bumper shields often experience thermal expansion and heat transfer related problems on-orbit because of the extreme temperatures. Design complexity is often necessary to alleviate these problems. Finally, metallic bumpers offer no real means of on-orbit augmentation without excessive vehicle design and/or configuration impacts.

U.S. Pat. No. 5,067,388, issued to Crews et al. discloses a hypervelocity impact shield that utilizes layers of impactor disrupting material which are spaced apart to progressively shock the incoming meteoroid or orbital debris particle to a vapor state which increases the penetration resistance dramatically. This concept is believed to provide the maximum passive protection of any heretofore existing shield design. The major shortcoming of the '388 shield is that there is no practical or efficient means disclosed in that patent for spaceably supporting the impactor disrupting material.

Present applicant is aware that current applications of the concepts described in the '388 patent have involved conventional rigid metallic support structures which are heavy, bulky and cumbersome. Such support structures prohibit their usefulness for spacecraft applications.

U.S. Pat. No. 5,610,363, also issued to Crews et al. discloses a hypervelocity impact (HVI) whipple shield and a method for shielding a wall from penetration by high velocity particular impacts where the whipple shield is comprised of spaced apart inner and outer sheets or walls with an intermediate cloth barrier arrangement comprised of ceramic cloth and high strength cloth which are interrelated by ballistic formulae.

OBJECTS AND SUMMARY OF THE INVENTION

It is therefore a principal object of the present invention to provide an efficient means of protecting a vulnerable spacecraft surface from hypervelocity impactors, such as meteoroids and orbital space debris.

In a broad aspect, the present invention comprises a hypervelocity impact shield assembly for protecting a spacecraft surface from hypervelocity impactors. The shield assembly includes at least one sacrificial impactor disrupting/shocking layer of hypervelocity impactor disrupting/shocking material. A primary spacing element, including space-rated open cell foam material, is positioned between the at least one sacrificial impactor disrupting/shocking layer and a spacecraft surface. A cover member is arranged and disposed relative to the sacrificial impactor disrupting/shocking layer and the primary spacing element to maintain the integrity of the hypervelocity impact shield assembly. In the event of exposure to a hypervelocity impactor, the sacrificial impactor disrupting/shocking layer is perforated while shocking the impactor breaking it into fragments, and/or melting it, and/or vaporizing it, thus providing a dispersion in the form of an expanding debris cloud/plume which spreads the impact energy of the impactor over a volume formed by the primary spacing element between the sacrificial impactor disrupting/shocking layer and the spacecraft surface. This significantly reduces impact lethality at the spacecraft surface. The space-rated open cell foam material provides an extremely lightweight, low-cost, efficient means of spacing and supporting the at least one sacrificial impactor disrupting/shocking layer before, during, and after launch.

In a preferred embodiment, the invention is in the form of a multi-shock assembly including a plurality of sacrificial impactor disrupting/shocking layers. In such instance, the hypervelocity impact shield assembly includes a plurality of secondary spacing elements. Each secondary spacing element is positioned adjacent an associated sacrificial impactor disrupting/shocking layer to form a multi-shock subassembly. Thus, a plurality of multi-shock subassemblies are provided which include alternating layers of sacrificial impactor disrupting/shocking layers and secondary spacing elements. The resulting multi-shock assembly includes a plurality sandwiched multi-shock subassemblies and the cover member arranged and disposed relative to the multi-shock subassemblies and a spacecraft surface to maintain the integrity of the multi-shock assembly.

The multi-shock assembly provides the high performance of the invention disclosed in the Crews et al. U.S. Pat. No. 5,067,388, without the necessity of burdensome support structures.

These and other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference of characters.

DETAILED DESCRIPTION OF THE PREFERRED EMBODIMENT

Figure 1:
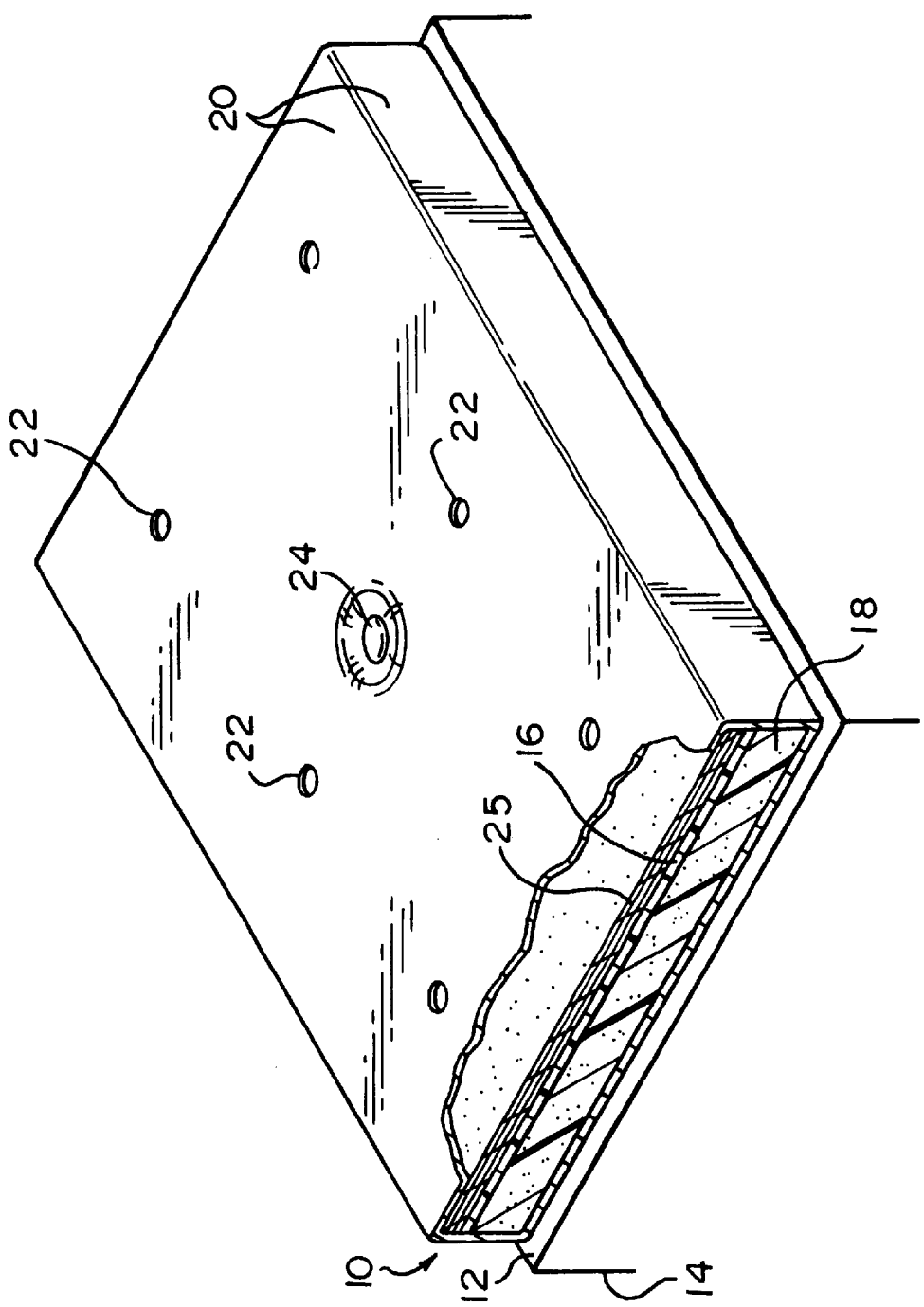
FIG. 1 is a top perspective view of a hypervelocity impact shield assembly shown attached to a spacecraft surface in accordance with the principles of the present invention.

Referring now to the drawings and characters of reference marked thereon, FIG. 1 illustrates a hypervelocity impact shield assembly in accordance with the principles of the present invention, designated generally as 10. The hypervelocity impact shield assembly 10 is shown attached to a portion of a spacecraft surface 12 of a spacecraft, designated generally as 14. The hypervelocity impact shield assembly 10 includes a sacrificial impactor disrupting/shocking layer 16 of hypervelocity impactor disrupting/shocking material. Such material may include, for example, Nextel® ceramic fiber cloth, Kevlar® material, aluminum foam, a metal matrix composite material, or Beta Cloth™ glass fiber material. Such materials have desirable shock properties, which are capable of raising the thermal state of a hypervelocity impactor to a less lethal condition.

A primary spacing element 18 is positioned between the sacrificial impactor disrupting/shocking layer 16 and the spacecraft surface 12. The primary spacing element is formed of an appropriate space-rated open cell foam material. As used herein the term "space-rated" refers to material that is space-qualified or qualified for use in spacecraft applications. Such a material may be, for example, the polymide foam material trademarked under the name Solimide® AC-406. The element 18 preferably is in a thickness of between about ⅛ inch to 4 inches depending on the desired performance of the shield assembly. The primary spacing element 18 is preferably a foam which is flexible and compressible/expandable to allow adequate covering of minor spacecraft surface protuberances. Such minor protuberances may include components such as fluid lines, avionics lines, wire harnesses, etc. Compressibility allows the assembly 10 to be flattened, if necessary, prior to launch to accommodate more payload volume and then be deployed on-orbit to provide maximum protection. This is especially important in satellite design when volume is often critical.

Use of open cell foam material minimizes the thermal expansion and heat transfer related problems at spacecraft surfaces because of the favorable thermal properties of such space-rated open cell foam. In addition, acoustic performance is enhanced due to the high acoustical absorption coefficient of such foam.

In certain instances a rigid foam may be prefered for use as the primary spacing element 18. This may be useful, for example, in the instance where a device is required to be mounted in a specific location outside the assembly 10.

A cover member 20 encapsulates the sacrificial impactor disrupting/shocking layer 16 and in the primary spacing element 18. The cover member 20 maintains the integrity of the hypervelocity impact shield assembly 10. The cover member 20 is preferably formed of Beta Cloth™ glass fiber material. Such material is commonly used in the spacecraft applications industry. Such material is relatively inert in a space environment and is also highly resistant to space degradation.

The cover member 20 includes outgassing holes 22, which are spaced along its outer surface. A pillowing restraint 24 is used for relatively large blankets, i.e. assemblies 10, to restrain the cover member 20 from excessive pillowing during outgassing. Multi-layer insulation (MLI) 25 is preferably positioned within the cover member 20 for providing thermal insulation. Such insulation 25 may be comprised of several layers of aluminized mylar (Kapton) separated by layers of a Dacron polyster separator.

Attachment portions of the lower outer surface of the cover member 20 includes an attachment elements for attaching the cover member 20 to the spacecraft surface 12. These attachment portions are hidden in FIG. 1, but will be discussed below in detail with respect to FIG. 3 in the discussion below regarding the FIG. 2/FIG. 3 embodiment.

During operation, in the event of exposure to a hypervelocity impactor, the sacrificial impactor disrupting/shocking layer 16 is perforated while shocking the impactor (not shown) breaking it into fragments and/or melting it, and/or vaporizing it. Thus, a dispersion is provided in the form of an expanding debris cloud/plume which spreads the impact energy of the impactor over a volume formed by the primary spacing element 18 between the sacrificial impactor/shocking layer 16 and the spacecraft 12, thereby significantly reducing impact lethality at the spacecraft surface 12.

Figure 2:
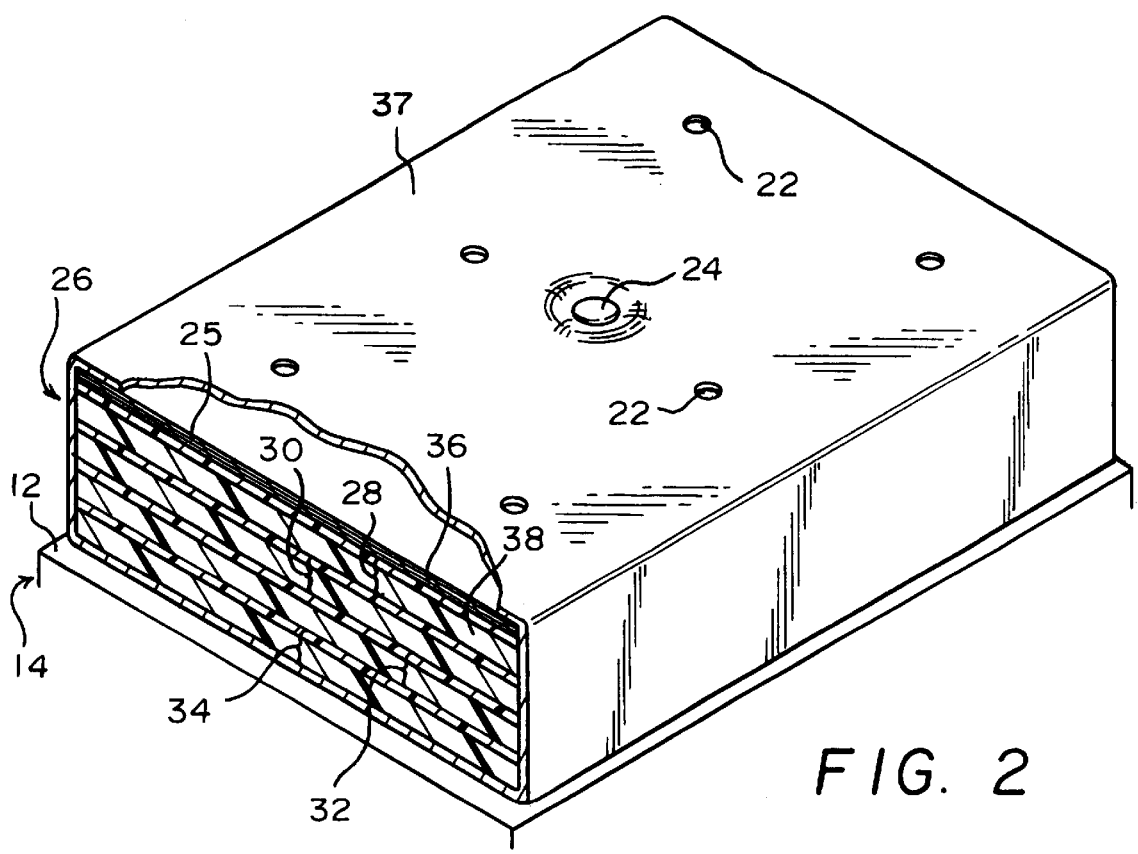
FIG. 2 is a top perspective view of a multi-shock assembly shown attached to a spacecraft surface, in accordance with the principles of the present invention.

Referring now to FIG. 2, a multi-shock assembly configuration of the present invention is illustrated, designated generally as 26. The multi-shock assembly 26 includes a plurality of sandwiched multi-shock subassemblies 28, 30, 32, 34. Each multi-shock subassembly includes a sacrificial impactor disrupting/shocking layer 36 of hypervelocity impactor disrupting/shocking material and a spacing element 38 comprising space-rated open cell foam material positioned adjacent the sacrificial impactor disrupting/shocking layer 36, as in the FIG. 1 embodiment. Thus, the spacing element 38 of the subassembly 28 may be deemed the "primary" spacing element, while the spacing elements of subassemblies 30, 32, and 34 are deemed "secondary" spacing elements. The resulting plurality of sandwiched multi-shock subassemblies includes alternating layers of sacrificial impactor disrupting/shocking layers and spacing elements. The materials that form these components may be the same as discussed above with respect to FIG. 1. Similarly, a similar cover member 37 is provided, as in the FIG. 1 embodiment.

Figure 3:
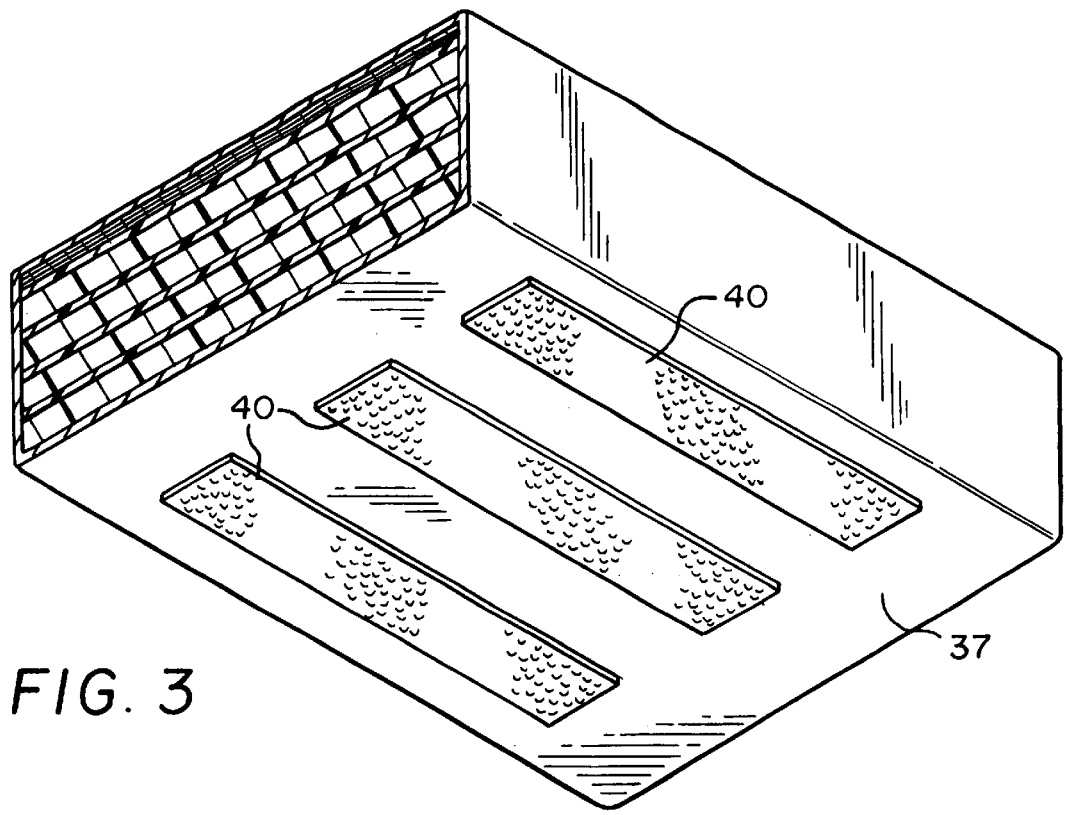
FIG. 3 is a bottom perspective view of the multi-shock assembly of FIG. 2, shown detached from the spacecraft surface to reveal the attachment portion of an outer surface of the cover member of the multi-shock assembly.

Referring now to FIG. 3, a bottom view, the attachment portions 40 of an outer surface of the cover member 37 is shown. The attachment portions 40 attach to the spacecraft surface 12 (see FIG. 2). The attachment portions 40 may comprise, for example, snap attachment elements, strap attachment elements, or Velcro® hook and pile fastening attachment elements (as shown).

The multi-shock assembly described herein is designed to produce the successive impact shocking of an impacting particle (not shown) and its resulting particulate fragments such that all of the material of which the original impacting particle is comprised is raised to the higher thermal state of total molten condition and/or vaporization as will preclude a puncture of the spacecraft surface 12 to be protected. In operation, the outermost sacrificial impactor disrupting/shocking layer 36 of the stack which first intercepts an impacting particle, breaks the impacting particle projectile (i.e., hypervelocity impactor) into smaller "sub-projectiles" that have been heated by the impact pressure to a very high temperature. These "sub-projectiles" then impact the subsequent second sacrificial impactor disrupting/shocking layer to produce further "sub-projectiles" to impact with the third sacrificial impactor disrupting/shocking layer, and so on, in a process of successive impacts with the evenly spaced layers which raises all of the impacting material to a successively higher degree of melt and eventual total vaporization if enough layers are used.

The utilization of a primary spacing element comprising space-rated open cell foam material to separate and support the various sacrificial impactor disrupting/shocking layers provides a light-weight, low cost alternative to conventional rigid metal support structures that are heavy and cumbersome. The present invention is self-contained and can be attached to external vulnerable/critical surfaces with little or no impact to the overall spacecraft design or configuration. In other words, the user merely needs to provide attach points and then install the invention. Heretofore, Whipple shields have required integration into the design, which requires costly changes and possible impacts to the overall spacecraft configurations since the metallic support structure usually must be attached directly to the primary structure of the spacecraft.

The present invention inherently minimizes any thermal expansion and heat transfer problems due to solar radiation because of the preferred thermal properties of the flexible shielding and spacing materials. Also, acoustic performance is enhanced due to the high acoustical absorption of such materials.

The hypervelocity impact shield assembly and multi-shock assembly of the present invention can be tailor-made to accommodate surface proturberances such as spacecraft components, clamps, fixtures, etc. These accommodations can be in the form of, but are not limited to, cut-outs and/or slits.

The present invention can be manufactured as a single blanket or multiple smaller blankets (patches) to protect a spacecraft surface.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A multi-shock assembly in combination with a spacecraft surface, for protecting said spacecraft surface from hypervelocity impactors, comprising:

a) a plurality of sandwiched multi-shock subassemblies, each multi-shock subassembly, comprising:
   a sacrificial impactor disrupting/shocking layer of hypervelocity impactor disrupting/shocking material; and
   a spacing element comprising space-rated open cell foam material positioned adjacent said sacrificial impactor disrupting/shocking layer,
wherein said plurality of sandwiched multi-shock subassemblies includes alternating layers of sacrificial impactor disrupting/shocking layers and spacing elements; and b) a cover member arranged and disposed relative to said multi-shock subassemblies and the spacecraft surface, when the multishock assembly is applied to the spacecraft surface, to maintain the integrity of the multi-shock assembly, wherein said cover member encapsulates said plurality of sandwiched multi-shock subassemblies, an attachment portion of an outer surface of said cover member attaching to said spacecraft surface, said attachment portion comprising snap attachment elements, wherein in the event of exposure to such a hypervelocity impactor, the multi-shock subassemblies successively impact shock the impactor raising its thermal state to a molten or vapor condition thus providing dispersions in the form of expanding debris clouds/plumes which spread the impact energy of the impactor over volumes formed by the spacing elements thereby significantly reducing impact lethality at the spacecraft surface.

2. A multi-shock assembly in combination with a spacecraft surface, for protecting said spacecraft surface from hypervelocity impactors, comprising:

a) a plurality of sandwiched multi-shock subassemblies, each multi-shock subassembly, comprising:
   a sacrificial impactor disrupting/shocking layer of hypervelocity impactor disrupting/shocking material; and
   a spacing element comprising space-rated open cell foam material positioned adjacent said sacrificial impactor disrupting/shocking layer,
wherein said plurality of sandwiched multi-shock subassemblies includes alternating layers of sacrificial impactor disrupting/shocking layers and spacing elements; and b) a cover member arranged and disposed relative to said multi-shock subassemblies and the spacecraft surface, when the multishock assembly is applied to the spacecraft surface, to maintain the integrity of the multi-shock assembly, wherein said cover member encapsulates said plurality of sandwiched multi-shock subassemblies, an attachment portion of an outer surface of said cover member attaching to said spacecraft surface, said attachment portion comprising strap attachment elements, wherein in the event of exposure to such a hypervelocity impactor, the multi-shock subassemblies successively impact shock the impactor raising its thermal state to a molten or vapor condition thus providing dispersions in the form of expanding debris clouds/plumes which spread the impact energy of the impactor over volumes formed by the spacing elements thereby significantly reducing impact lethality at the spacecraft surface.

3. A multi-shock assembly in combination with a spacecraft surface, for protecting said spacecraft surface from hypervelocity impactors, comprising:

a) a plurality of sandwiched multi-shock subassemblies, each multi-shock subassembly, comprising:
  a sacrificial impactor disrupting/shocking layer of hypervelocity impactor disrupting/shocking material; and
  a spacing element comprising space-rated open cell foam material positioned adjacent said sacrificial impactor disrupting/shocking layer,
wherein said plurality of sandwiched multi-shock subassemblies includes alternating layers of sacrificial impactor disrupting/shocking layers and spacing elements; and b) a cover member arranged and disposed relative to said multi-shock subassemblies and the spacecraft surface, when the multishock assembly is applied to the spacecraft surface, to maintain the integrity of the multi-shock assembly, wherein said cover member encapsulates said plurality of sandwiched multi-shock subassemblies, an attachment portion of an outer surface of said cover member attaching to said spacecraft surface, said attachment portion comprising hook and pile fastening attachment elements, wherein in the event of exposure to such a hypervelocity impactor, the multi-shock subassemblies successively impact shock the impactor raising its thermal state to a molten or vapor condition thus providing dispersions in the form of expanding debris clouds/plumes which spread the impact energy of the impactor over volumes formed by the spacing elements thereby significantly reducing impact lethality at the spacecraft surface.

4. A multi-shock assembly for protecting a spacecraft surface from hypervelocity impactors, comprising:

a) a plurality of sandwiched multi-shock subassemblies, each multi-shock subassembly, comprising:
  a sacrificial impactor disrupting/shocking layer of hypervelocity impactor disrupting/shocking material comprising aluminum foam; and
  a spacing element comprising space-rated open cell foam material positioned adjacent said sacrificial impactor disrupting/shocking layer,
wherein said plurality of sandwiched multi-shock subassemblies includes alternating layers of sacrificial impactor disrupting/shocking layers and spacing elements; and b) a cover member arranged and disposed relative to said multi-shock subassemblies and the spacecraft surface, when the multishock assembly is applied to the spacecraft surface, to maintain the integrity of the multi-shock assembly, wherein in the event of exposure to such a hypervelocity impactor, the multi-shock subassemblies successively impact shock the impactor raising its thermal state to a molten or vapor condition thus providing dispersions in the form of expanding debris clouds/plumes which spread the impact energy of the impactor over volumes formed by the spacing elements thereby significantly reducing impact lethality at the spacecraft surface.

5. A multi-shock assembly for protecting a spacecraft surface, for protecting said spacecraft surface from hypervelocity impactors, comprising:

a) a plurality of sandwiched multi-shock subassemblies, each multi-shock subassembly, comprising:
  a sacrificial impactor disrupting/shocking layer of hypervelocity impactor disrupting/shocking material comprising metal matrix composite material; and
  a spacing element comprising space-rated open cell foam material positioned adjacent said sacrificial impactor disrupting/shocking layer,
wherein said plurality of sandwiched multi-shock subassemblies includes alternating layers of sacrificial impactor disrupting/shocking layers and spacing elements; and b) a cover member arranged and disposed relative to said multi-shock subassemblies and the spacecraft surface, when the multishock assembly is applied to the spacecraft surface, to maintain the integrity of the multi-shock assembly, wherein in the event of exposure to such a hypervelocity impactor, the multi-shock subassemblies successively impact shock the impactor raising its thermal state to a molten or vapor condition thus providing dispersions in the form of expanding debris clouds/plumes which spread the impact energy of the impactor over volumes formed by the spacing elements thereby significantly reducing impact lethality at the spacecraft surface.

* * * * *